(12) United States Patent
Satpathy et al.

(10) Patent No.: US 10,579,335 B2
(45) Date of Patent: Mar. 3, 2020

(54) MULTIPLIER CIRCUIT FOR ACCELERATED SQUARE OPERATIONS

(71) Applicant: Intel Corporation, Santa Clara, CA (US)

(72) Inventors: Sudhir K. Satpathy, Hillsboro, OR (US); Sanu K. Mathew, Hillsboro, OR (US); Vikram B. Suresh, Hillsboro, OR (US); Raghavan Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 182 days.

(21) Appl. No.: 15/627,526

(22) Filed: Jun. 20, 2017

(65) Prior Publication Data

US 2018/0364982 A1 Dec. 20, 2018

(51) Int. Cl.
*G06F 7/52* (2006.01)
*G06F 7/523* (2006.01)
*G06F 21/72* (2013.01)
*G06F 21/60* (2013.01)

(52) U.S. Cl.
CPC ............ *G06F 7/5235* (2013.01); *G06F 7/523* (2013.01); *G06F 21/602* (2013.01); *G06F 21/72* (2013.01); *G06F 2207/5523* (2013.01)

(58) Field of Classification Search
CPC ...... G06F 7/5235; G06F 21/602; G06F 7/523; G06F 21/72; G06F 2207/5523
See application file for complete search history.

(56) References Cited

U.S. PATENT DOCUMENTS

| | | | | |
|---|---|---|---|---|
| 6,748,412 | B2* | 6/2004 | Ruehle | G06F 7/556 708/491 |
| 7,640,285 | B1* | 12/2009 | Oberman | G06F 7/57 708/272 |
| 2007/0260664 | A1* | 11/2007 | Bertoni | G06F 7/722 708/490 |
| 2016/0110163 | A1* | 4/2016 | Rarick | G06F 7/537 708/503 |

OTHER PUBLICATIONS

Thapliyal et al, "An efficient method of elliptic curve encryption using Ancient India" 2006, 48th Midwest Symposium on Circuits and Systems, 2005. Electronic ISSN: 1558-3899, pp. 1-3 (Year: 2006).*

(Continued)

*Primary Examiner* — Harunur Rashid
(74) *Attorney, Agent, or Firm* — Alliance IP, LLC

(57) ABSTRACT

In one embodiment, an apparatus comprises a multiplier circuit to: identify a plurality of partial products associated with a multiply operation; partition the plurality of partial products into a first set of partial products, a second set of partial products, and a third set of partial products; determine whether the multiply operation is associated with a square operation; upon a determination that the multiply operation is associated with the square operation, compute a result based on the first set of partial products and the third set of partial products; and upon a determination that the multiply operation is not associated with the square operation, compute the result based on the first set of partial products, the second set of partial products, and the third set of partial products.

21 Claims, 10 Drawing Sheets

(56) References Cited

OTHER PUBLICATIONS

Chen el al., "A New Montgomery Modular Multiplication Algorithm and its VLSI Design for RSA Cryptosystem" Jun. 25, 2007, 2007 IEEE (Year: 2007).*

Hars el al., "Fast Truncated Multiplication for Cryptographic Applications" Springer-Verlag Berlin Heidelberg 2005, CHES 2005. Lecture Notes in Computer Science, vol. 3659. Springer, Berlin,Heidelberg, p. 1-15 (Year: 2005).*

* cited by examiner

MULTIPLIER CIRCUIT FOR ACCELERATED SQUARE OPERATIONS

FIELD OF THE SPECIFICATION

This disclosure relates in general to the field of computer architecture and processing, and more particularly, though not exclusively, to a multiplier circuit for accelerated square operations.

BACKGROUND

The increasing demand for robust computer security has led to widespread use of cryptography in mainstream computer systems and networks, along with the development of increasingly sophisticated and secure modern cryptography approaches. Cryptography often involves computationally demanding operations, particularly as the sophistication and security of modern cryptography continues to increase. For example, RSA encryption is a widely used form of public key or asymmetric cryptography, and is implemented using operations that involve modular exponentiation, which can be a computationally demanding operation. In some cases, modular exponentiation can be implemented using a series of multiply and square operations. Performing these multiply and square operations using a generic multiplier circuit is inefficient, however, as it results in generation and accumulation of redundant partial products for square operations.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
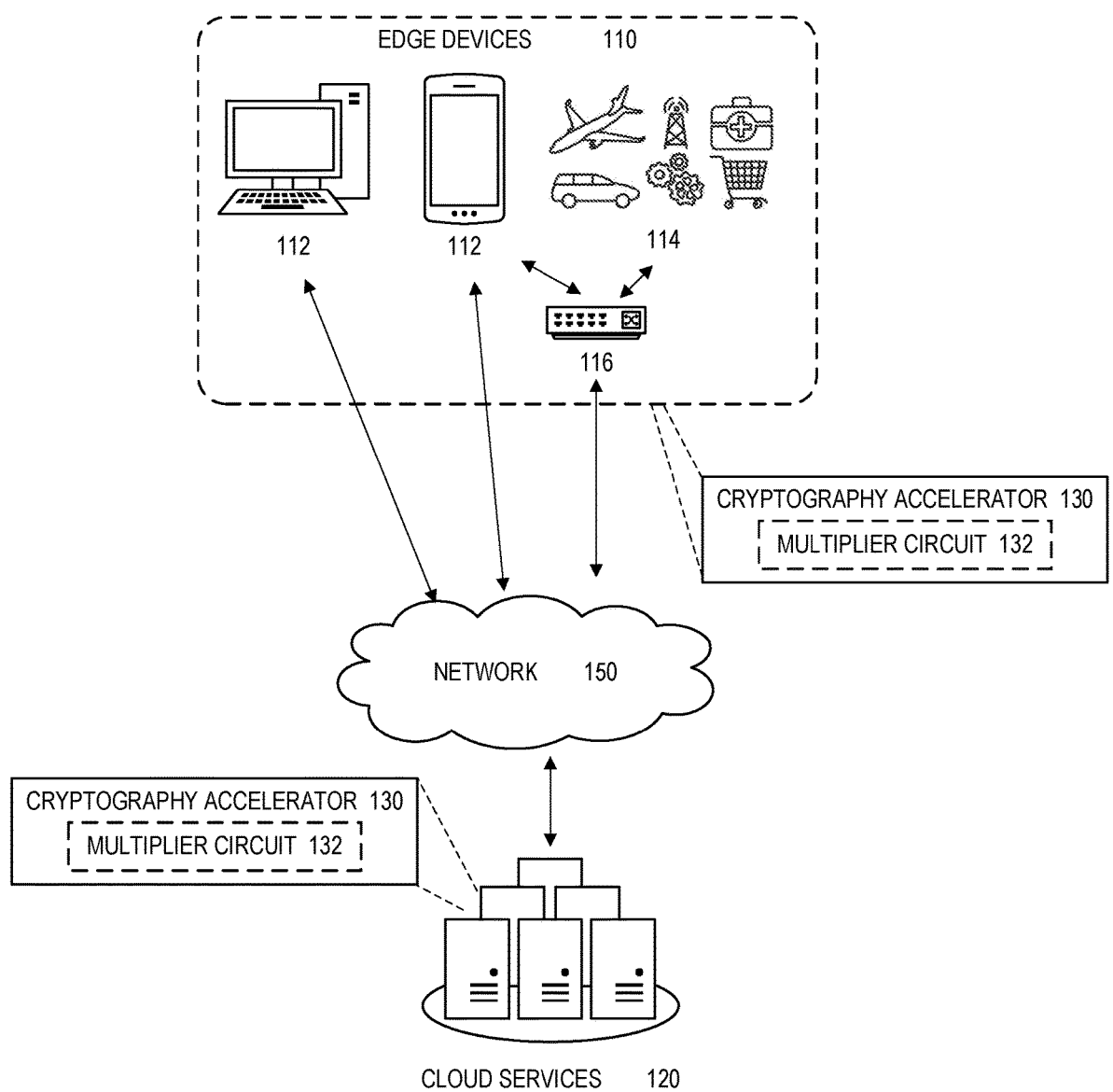
FIG. 1 illustrates a schematic diagram of an example computing system in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

The increasing demand for robust computer security has led to widespread use of cryptography in mainstream computer systems and networks, along with the development of modern cryptography approaches that are increasingly sophisticated and secure. Cryptography often involves computationally demanding operations, however, particularly as the sophistication and security of modern cryptography continues to increase. For example, RSA encryption is a widely used form of public key or asymmetric cryptography. The level of security offered by RSA encryption is proportional to the number of bits used in the keys, and due to an increasing demand for security, many mainstream applications are adopting RSA encryption based on larger key sizes (e.g., 4 k-bit RSA encryption). RSA encryption, however, is based on modular exponentiation, which is a computationally demanding operation. Accordingly, RSA implementations that use larger key sizes may require significantly more computing power, which may diminish the overall encryption and decryption throughput. For example, for 4 k-bit RSA implementations, an operation may require hundreds of millions of computing cycles to complete, with almost all of the total latency (e.g., over 99%) attributed to modular exponentiation operations. Accordingly, it is crucial to perform these modular exponentiation operations as efficiently as possible.

In some cases, for example, modular exponentiation for RSA operations can be implemented using "exponentiation by squaring," which is an approach to performing exponentiation using a series of multiply and square operations. While these multiply and square operations could be performed using a generic multiplier circuit, performing a square operation using a generic multiplier circuit results in generation and accumulation of redundant partial products. For example, because a square operation involves multiplication of the same number by itself, approximately half of the partial products involved in the multiplication are redundant or duplicative. Moreover, a generic multiplier circuit generates and accumulates all partial products when performing multiplication, regardless of whether they are redundant or duplicative. Accordingly, a generic multiplier circuit is inefficient for square operations, as it requires redundant computations, dissipates wasteful energy, and penalizes the entire data path of the circuit (e.g., including any control unit or register files) by accessing and tracking the redundant operands.

Accordingly, this disclosure describes various embodiments of a multiplier circuit that can perform accelerated square operations. The described embodiments can perform square operations approximately twice as fast as existing approaches, for example, by opportunistically skipping the generation and accumulation of roughly half of the partial products involved in a square operation. In some embodiments, for example, the multiplier circuit may include partial product accumulators that are organized into two separate clusters. The multiplier circuit can perform regular multiply operations by pairing these clusters together and collectively using their accumulated partial product results. The multiplier circuit can perform square operations, however, using only one of the partial product clusters, while the other cluster is selectively decoupled and power gated to avoid generating and accumulating redundant partial products. In this manner, the multiplier circuit can perform square operations using a faster and more energy-efficient approach.

Accordingly, the described embodiments are particularly advantageous for implementing cryptography (e.g., key or signature generation, encryption, or decryption) or other types of functionality that involve computationally demanding arithmetic. For example, given that squaring is the prevalent operation in RSA encryption, using the described embodiments to implement RSA encryption can reduce the overall latency of RSA operations by an average of 33% for random operands, while simultaneously reducing energy consumption by 30%. In this manner, the described embodiments provide improvements in both overall RSA throughput and energy-efficiency, rendering them particularly advantageous for high-end systems that provide RSA encryption using large key sizes (e.g., 4 k-bit RSA encryption), or for low-end devices with power and resource constraints (e.g., by trading some or all of the gains in throughput for a more lightweight multiplier circuit, such as one with a pruned data path that operates on 8 bit or 16 bit operands).

Example embodiments that may be used to implement the features and functionality of this disclosure will now be described with more particular reference to the attached FIGURES.

FIG. 1 illustrates a schematic diagram of an example computing system 100. In various embodiments, system 100 and/or its underlying components may include the functionality described throughout this disclosure for performing accelerated multiply and square operations. In some embodiments, for example, multiply and square operations may be used in system 100 to implement cryptography, such as RSA cryptography. For example, system 100 and/or its underlying components may include cryptography accelerators 130 that use the accelerated multiply and square functionality described throughout this disclosure to improve the performance of RSA cryptography operations. For example, in some embodiments, a cryptography accelerator 130 may include a multiplier circuit 132 that performs accelerated multiply and square operations. Example embodiments for performing accelerated multiply and square operations are described further throughout this disclosure and in connection with the remaining FIGURES. Moreover, cryptography accelerators 130 may be implemented by any component of system 100, such as edge devices 110, cloud services 120, and/or communications network 150. The various components of computing system 100 will now be discussed further below.

Edge devices 110 may include any equipment and/or devices deployed or connected near the "edge" of a communication system 100. In the illustrated embodiment, edge devices 110 include end-user devices 112 (e.g., desktops, laptops, mobile devices), Internet-of-Things (IoT) devices 114, and gateways and/or routers 116, among other examples. Edge devices 110 may communicate with each other and/or with other remote networks and services (e.g., cloud services 120) through one or more networks and/or communication protocols, such as communication network 150. Moreover, in some embodiments, certain edge devices 110 may include the optimized multiply and square functionality described throughout this disclosure.

End-user devices 112 may include any device that enables or facilitates user interaction with computing system 100, including, for example, desktop computers, laptops, tablets, mobile phones and other mobile devices, and wearable devices (e.g., smart watches, smart glasses, headsets), among other examples.

IoT devices 114 may include any device capable of communicating and/or participating in an Internet-of-Things (IoT) system or network. IoT systems may refer to new or improved ad-hoc systems and networks composed of multiple different devices (e.g., IoT devices 114) interoperating and synergizing for a particular application or use case. Such ad-hoc systems are emerging as more and more products and equipment evolve to become "smart," meaning they are controlled or monitored by computer processors and are capable of communicating with other devices. For example, an IoT device 114 may include a computer processor and/or communication interface to allow interoperation with other components of system 100, such as with cloud services 120 and/or other edge devices 110. IoT devices 114 may be "greenfield" devices that are developed with IoT capabilities from the ground-up, or "brownfield" devices that are created by integrating IoT capabilities into existing legacy devices that were initially developed without IoT capabilities. For example, in some cases, IoT devices 114 may be built from sensors and communication modules integrated in or attached to "things," such as equipment, toys, tools, vehicles, living things (e.g., plants, animals, humans), and so forth. Alternatively, or additionally, certain IoT devices 114 may rely on intermediary components, such as edge gateways or routers 116, to communicate with the various components of system 100.

IoT devices 114 may include various types of sensors for monitoring, detecting, measuring, and generating sensor data and signals associated with characteristics of their environment. For instance, a given sensor may be configured to detect one or more respective characteristics, such as movement, weight, physical contact, biometric properties, temperature, wind, noise, light, position, humidity, radiation, liquid, specific chemical compounds, battery life, wireless signals, computer communications, and bandwidth, among other examples. Sensors can include physical sensors (e.g., physical monitoring components) and virtual sensors (e.g., software-based monitoring components). IoT devices 114 may also include actuators to perform various actions in their respective environments. For example, an actuator may be used to selectively activate certain functionality, such as toggling the power or operation of a security system (e.g., alarm, camera, locks) or household appliance (e.g., audio system, lighting, HVAC appliances, garage doors), among other examples.

Indeed, this disclosure contemplates use of a potentially limitless universe of IoT devices 114 and associated sensors/actuators. IoT devices 114 may include, for example, any type of equipment and/or devices associated with any type of system 100 and/or industry, including transportation (e.g., automobile, airlines), industrial manufacturing, energy (e.g., power plants), telecommunications (e.g., Internet, cellular, and television service providers), medical (e.g., healthcare, pharmaceutical), food processing, and/or retail industries, among others. In the transportation industry, for example, IoT devices 114 may include equipment and devices associated with aircrafts, automobiles, or vessels, such as navigation systems, autonomous flight or driving systems, traffic sensors and controllers, and/or any internal mechanical or electrical components that are monitored by sensors (e.g., engines). IoT devices 114 may also include equipment, devices, and/or infrastructure associated with industrial manufacturing and production, shipping (e.g., cargo tracking), communications networks (e.g., gateways, routers, servers, cellular towers), server farms, electrical power plants, wind farms, oil and gas pipelines, water treatment and distribution, wastewater collection and treatment, and weather monitoring (e.g., temperature, wind, and humidity sensors), among other examples. IoT devices 114 may also include, for example, any type of "smart" device or system, such as smart entertainment systems (e.g., televisions, audio systems, videogame systems), smart household or office appliances (e.g., heat-ventilation-air-conditioning (HVAC) appliances, refrigerators, washers and dryers, coffee brewers), power control systems (e.g., automatic electricity, light, and HVAC controls), security systems (e.g., alarms, locks, cameras, motion detectors, fingerprint scanners, facial recognition systems), and other home automation systems, among other examples. IoT devices 114 can be statically located, such as mounted on a building, wall, floor, ground, lamppost, sign, water tower, or any other fixed or static structure. IoT devices 114 can also be mobile, such as devices in vehicles or aircrafts, drones, packages (e.g., for tracking cargo), mobile devices, and wearable devices, among other examples. Moreover, an IoT device 114 can also be any type of edge device 110, including end-user devices 112 and edge gateways and routers 116.

Edge gateways and/or routers 116 may be used to facilitate communication to and from edge devices 110. For example, gateways 116 may provide communication capabilities to existing legacy devices that were initially developed without any such capabilities (e.g., "brownfield" IoT devices). Gateways 116 can also be utilized to extend the geographical reach of edge devices 110 with short-range, proprietary, or otherwise limited communication capabilities, such as IoT devices 114 with Bluetooth or ZigBee communication capabilities. For example, gateways 116 can serve as intermediaries between IoT devices 114 and remote networks or services, by providing a front-haul to the IoT devices 114 using their native communication capabilities (e.g., Bluetooth, ZigBee), and providing a back-haul to other networks 150 and/or cloud services 120 using another wired or wireless communication medium (e.g., Ethernet, Wi-Fi, cellular). In some embodiments, a gateway 116 may be implemented by a dedicated gateway device, or by a general purpose device, such as another IoT device 114, end-user device 112, or other type of edge device 110.

In some instances, gateways 116 may also implement certain network management and/or application functionality (e.g., IoT management and/or IoT application functionality for IoT devices 114), either separately or in conjunction with other components, such as cloud services 120 and/or other edge devices 110. For example, in some embodiments, configuration parameters and/or application logic may be pushed or pulled to or from a gateway device 116, allowing IoT devices 114 (or other edge devices 110) within range or proximity of the gateway 116 to be configured for a particular IoT application or use case.

Cloud services 120 may include services that are hosted remotely over a network 150, or in the "cloud." In some embodiments, for example, cloud services 120 may be remotely hosted on servers in datacenter (e.g., application servers or database servers). Cloud services 120 may include any services that can be utilized by or for edge devices 110, including but not limited to, data storage, computational services (e.g., data analytics, searching, diagnostics and fault management), security services (e.g., surveillance, alarms, user authentication), mapping and navigation, geolocation services, network or infrastructure management, IoT application and management services, payment processing, audio and video streaming, messaging, social networking, news, and weather, among other examples. Moreover, in some embodiments, certain cloud services 120 may include the optimized multiply and square functionality described throughout this disclosure.

Network 150 may be used to facilitate communication between the components of computing system 100. For example, edge devices 110, such as end-user devices 112 and IoT devices 114, may use network 150 to communicate with each other and/or access one or more remote cloud services 120. Network 150 may include any number or type of communication networks, including, for example, local area networks, wide area networks, public networks, the Internet, cellular networks, Wi-Fi networks, short-range networks (e.g., Bluetooth or ZigBee), and/or any other wired or wireless networks or communication mediums.

Cryptography accelerators 130 may be used to accelerate cryptography operations, such as RSA cryptography operations. In some embodiments, for example, a cryptography accelerator 130 may include a multiplier circuit 132 to accelerate the multiply and square operations associated with RSA cryptography. A multiplier circuit 132, for example, may be implemented using the embodiments of accelerated multiplication and squaring described throughout this disclosure. Moreover, cryptography accelerator 130 and/or multiplier circuit 132 may be implemented using any type or combination of hardware and/or software logic, including semiconductor chips, accelerators, transistors, integrated circuits, application specific integrated circuits (ASIC), field programmable gate arrays (FPGA), processors (e.g., microprocessors), and/or any software logic, firmware, instructions, or code.

Any, all, or some of the computing devices of system 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within system 100 of FIG. 1 may be utilized in each alternative implementation of the present disclosure. Additionally, one or more of the elements described in connection with the examples of FIG. 1 may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Optimized Multiplication and Squaring

Figure 2:
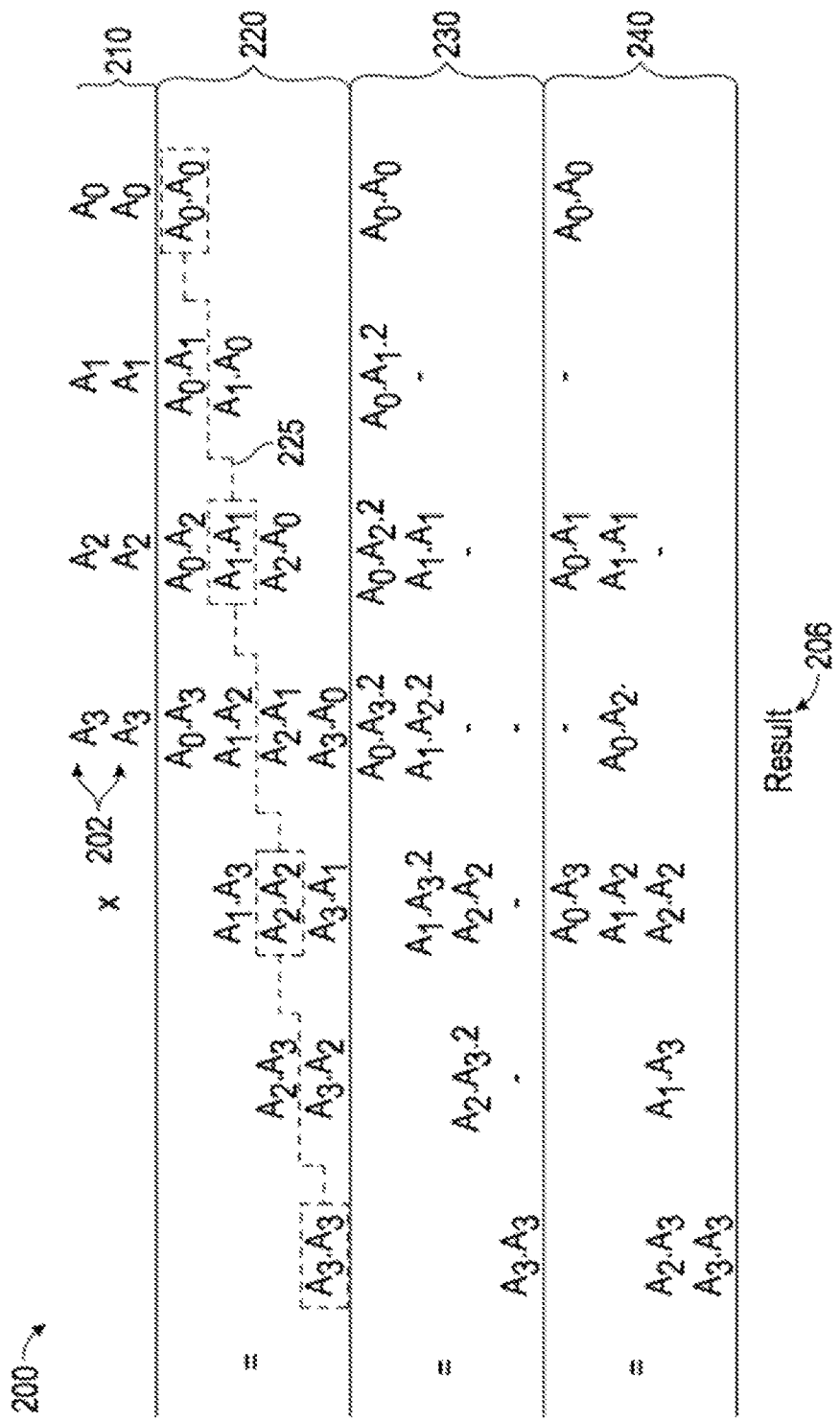
FIG. 2 illustrates an example of an optimized square operation.

FIG. 2 illustrates an example of an optimized square operation 200. In some embodiments, square operation 200 may be performed by an optimized multiplier circuit (e.g., multiplier circuit 300 of FIG. 3).

In the illustrated example, square operation 200 is performed on an operand 202 with four bits $A_3$-$A_0$. Square operation 200 is implemented by multiplying operand 202 against itself, as shown by reference label 210. In general, multiplying two binary operands can be accomplished by multiplying each bit of the first operand with each bit of the second operand, and then accumulating the resulting partial products. Accordingly, multiplying 4-bit operand 202 against itself involves accumulation of 16 partial products, as shown by reference label 220. These partial products are identified in the illustrated example using the notation "$A_x \cdot A_y$", which represents a partial product operation associated with multiplying bits $A_x$ and $A_y$ of operand 202. For example, partial product $A_0 \cdot A_0$ represents multiplication of bit $A_0$ against itself, partial product $A_0 \cdot A_1$ represents multiplication of bits $A_0$ and $A_1$, and so forth. However, because square operation 200 involves multiplication of the same operand 202 against itself, approximately half of the associated partial products identified by reference label 220 are redundant or duplicative. For example, partial product $A_1 \cdot A_0$ is duplicative of partial product $A_0 \cdot A_1$, partial product $A_2 \cdot A_0$ is duplicative of partial product $A_0 \cdot A_2$, and so forth. In general, the partial products below diagonal line 225 are duplicative of those above diagonal line 225, while the partial products that are intersected by diagonal line 225 are unique. Accordingly, these partial products can effectively be partitioned into three sections: upper, lower, and diagonal partial product sections. In this manner, square operation 200 can be performed more efficiently by computing duplicate partial products only once and then doubling the result. For example, as described further below, duplicate partial products at any bit index can be processed more efficiently by computing only one of the duplicative partial products, doubling the result by shifting it to the next highest bit index, and then ignoring the other duplicative partial product.

For example, as shown by reference label 230, the partial products with redundant counterparts from reference label 220 have been doubled, and their redundant counterparts have been omitted. The doubled partial products of reference label 230 are identified using the notation "$A_x \cdot A_y \cdot 2$." For example, in reference label 230, partial product $A_0 \cdot A_1 \cdot 2$ represents doubled partial product $A_0 \cdot A_1$, while the corresponding redundant partial product $A_1 \cdot A_0$ has been omitted. Moreover, given that shifting a binary number by one higher bit index doubles the number, doubling a particular partial product can be achieved by shifting it to the next highest bit index (e.g., lift shifting the partial product by a single bit index). Accordingly, as shown by reference label 240, the doubled partial products from reference label 230 have each been shifted left to the next highest bit index.

The result 206 of square operation 200 can then be computed by generating and accumulating the 10 resulting partial products identified by reference label 240. In this manner, by ignoring partial products that are redundant, and instead doubling their associated partial product counterparts, square operation 200 is reduced from 16 partial product operations to 10 partial product operations. In general, for a multiplier circuit with n-bit operands, this approach reduces the number of partial products for square operations by $n^2/2-n$. For high radix multipliers, this approach achieves a reduction in latency and energy consumption of approximately 50% during squaring operations.

Figure 3:
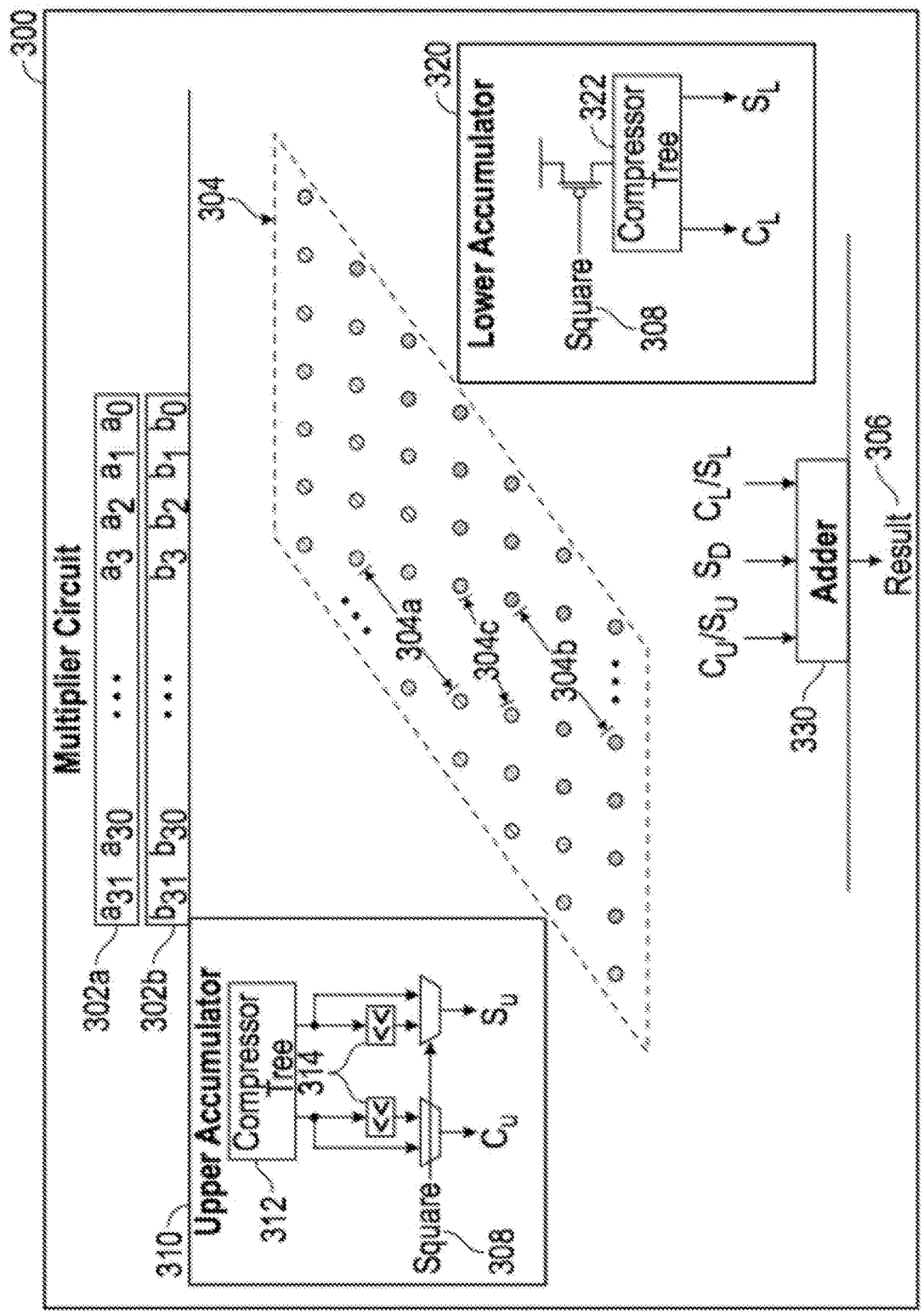
FIG. 3 illustrates an example embodiment of an optimized multiplier circuit.

FIG. 3 illustrates an example embodiment of an optimized multiplier circuit 300. In various embodiments, multiplier circuit 300 and its associated components and functionality may be implemented using any type or combination of hardware and/or software logic, including semiconductor chips, accelerators, transistors, integrated circuits, application specific integrated circuits (ASIC), field programmable gate arrays (FPGA), processors (e.g., microprocessors), and/or any software logic, firmware, instructions, or code.

Multiplier circuit 300 can be used to perform accelerated multiply and square operations. In some embodiments, for example, a cryptography accelerator used to accelerate RSA cryptography operations may use multiplier circuit 300 to accelerate the multiply and square operations associated with RSA cryptography. RSA encryption is a form of cryptography based on modular exponentiation, which can be implemented using the "exponentiation by squaring" approach through a series of multiply and square operations. For n-bit operands, a multiply or square operation involves accumulation of $n^2$ partial products. However, because a square operation involves multiplication of the same number by itself, approximately half of the partial products involved in the operation are redundant or duplicative. Accordingly, optimized multiplier circuit 300 includes on-the-fly configurability to accelerate square operations by opportunistically skipping the generation and accumulation of the redundant partial products. Given that squaring is the prevalent operation in RSA encryption, eliminating these redundant partial product computations can result in significant performance gains. Accordingly, multiplier circuit 300 can be used to perform the multiply and square operations for RSA encryption in a more efficient manner.

In the illustrated embodiment, multiplier circuit 300 is implemented to perform multiplication on two 32-bit operands 302a,b. Operand 302a comprises bits $a_{31}$-$a_0$, and operand 302b comprises bits $b_{31}$-$b_0$. In other embodiments, however, multiplier circuit 300 may be implemented to multiply operands of any size (e.g., 8 bits, 16 bits, 64 bits, 128 bits, and so forth).

As shown in the illustrated example, the partial products 304 associated with multiplication of operands 302 are effectively partitioned into three sections 304a-c: an upper section 304a, a lower section 304b, and a diagonal or middle section 304c. The diagonal partial products 304c are based on the same place value (e.g., bit index) in each operand 302 (e.g., $a_0 \cdot b_0$, $a_1 \cdot b_1$, and so forth), while the upper partial products 304a and lower partial products 304b are based on different place values in each operand 302. Moreover, the place values of the upper partial products 304a are the reverse of those of the lower partial products 304b (e.g., the place values of upper partial product $a_0 \cdot b_1$ are the reverse of lower partial product $a_1 \cdot b_0$). General multiplication can be performed by accumulating the upper, lower, and diagonal partial products 304a-c. For square operations, however, the partitioning results in upper and lower partial products 304a,b that are redundant to each other, and diagonal partial products 304c that are unique. Accordingly, square operations can be performed based on the upper partial products 304a and the diagonal partial products 304c, while disregarding the redundant lower partial products 304b, as explained further below.

Multiplier circuit 300 includes separate accumulators 310 and 320 for respectively generating and accumulating the upper 304a and lower 304b partial products. For example, the upper partial products 304a can be generated and accumulated by upper partial product accumulator 310, while the lower partial products 304b can be generated and accumulated by lower partial product accumulator 320. The upper and lower accumulators 310 and 320 use separate compressor trees 312 and 322 to accumulate their respective upper and lower partial products 304a,b. Moreover, each accumulator 310 and 320 outputs a sum and carry value based on the accumulation of its respective partial products. For example, upper accumulator 310 outputs sum $S_u$ and carry $C_u$ based on the accumulation of upper partial products 304a, and lower accumulator 320 outputs sum $S_L$ and carry $C_L$ based on the accumulation of lower partial products 304b. Moreover, the sum of the diagonal partial products 304c is computed separately as sum $S_d$. Finally, multiplier circuit 300 includes an adder 330 to compute the final multiplication result 306 by adding together the sum and carry values associated with the upper, lower, and diagonal partial products 304.

When performing general multiplication aside from squaring, the upper and lower partial product accumulators 310 and 320 are both active and respectively compute sum and carry values for the upper and lower partial products 304a,b. In addition, the sum of the diagonal partial products 304c is computed separately as sum $S_d$. The final result 306 of the multiplication is then computed by adder 330 by adding together the sum and carry for the upper partial products ($S_u$ and $C_u$), the sum and carry for the lower partial products ($S_L$ and $C_L$), and the sum of the diagonal partial products 304c ($S_d$).

When performing squaring operations, however, the lower partial product accumulator 320 is selectively deactivated and/or powered down (e.g., using a power gate) to avoid generating and accumulating partial products that are redundant to those generated by the upper accumulator 320. In lieu of generating these redundant partial products, the upper accumulator 310 simply doubles its computed partial products by shifting them to the next highest bit index. In the illustrated embodiment, for example, upper accumulator 310 includes shifters 314 to shift and double the partial products. Upper accumulator 310 ultimately outputs a sum ($S_u$) and carry ($C_u$) based on accumulation of the doubled partial products. Moreover, since the lower accumulator 320 is disabled, its sum and carry ($S_L$ and $C_L$) have a value of 0. Accordingly, the final result 306 of the squaring operation is then computed using adder 330 by adding the sum and carry of the upper accumulator 310 ($S_u$ and $C_u$) with the sum of the diagonal partial products 304c ($S_d$).

In some embodiments, multiplier circuit 300 may include a signal input or interface to indicate when a square operation is being performed, thus allowing the upper and lower accumulators 310 and 320 to be configured appropriately. For example, in the illustrated embodiment, multiplier circuit 300 includes square signal 308 to indicate when a square operation is being performed. Square signal 308 feeds into upper accumulator 310 and lower accumulator 320 as an input parameter used to configure the accumulators for a square operation. In the lower accumulator 320, however, square signal 308 is first inverted, and thus the inverse of square signal 308 is used as the input to the lower accumulator 320. Accordingly, when square signal 308 is '1', the input into the upper accumulator 310 is '1' while the input into the lower accumulator 320 is '0', and vice versa. In this manner, setting square signal 308 to '1' activates squaring mode by disabling lower accumulator 320 and configuring upper accumulator 310 to perform partial product shifting and doubling. Similarly, setting square signal 308 to '0' disables squaring mode by reactivating lower accumulator 320 and configuring upper accumulator 310 to accumulate partial products normally. Accordingly, when performing general multiplication, square signal 308 is set to '0' to disable squaring mode. Moreover, in some embodiments, disabling lower accumulator 320 during square operations (e.g., when square signal 308 is '1') may be achieved by implementing kill circuitry in lower accumulator 320. For example, the kill circuitry may be configured to kill the sum ($S_L$) and carry ($C_L$) outputs of lower accumulator 320 during square operations. In some embodiments, for example, lower accumulator 320 may include the sum and carry kill circuitry illustrated in FIGS. 4A-B. Finally, in various embodiments, the squaring mode of multiplier circuit 300 (e.g., configured using square signal 308) may be a configurable mode, and/or multiplier circuit 300 may automatically enable squaring mode when the multiplication operands are equivalent.

Figure 4A:
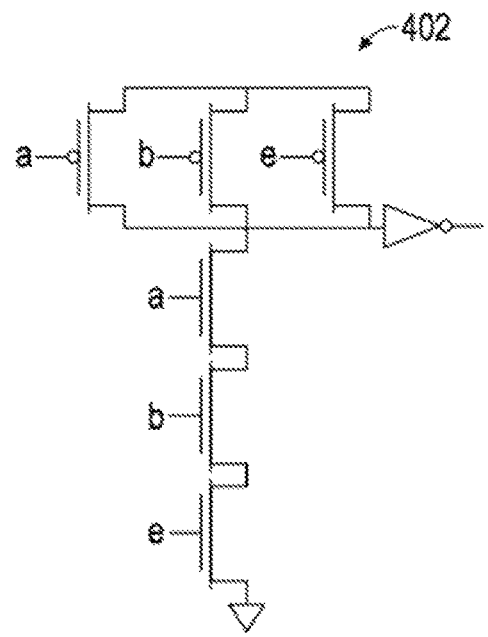
FIGS. 4A-B illustrate example embodiments of sum and carry kill circuitry for an optimized multiplier circuit.
Figure 4B:
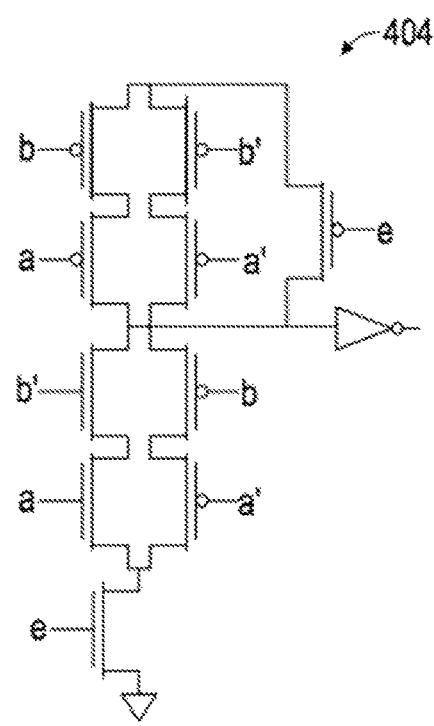

FIGS. 4A-B illustrate example embodiments of sum and carry kill circuitry for an optimized multiplier circuit. In some embodiments, for example, sum and carry kill circuitry may be implemented in multiplier circuit 300 to disable the lower accumulator 320 during square operations, thus causing the sum ($S_L$) and carry ($C_L$) of the lower accumulator 320 to have values of 0.

FIG. 4A illustrates kill circuitry 402 for the sum output ($S_L$) of the lower accumulator, while FIG. 4B illustrates kill circuitry 404 for the carry output ($C_L$) of the lower accumulator. The sum and carry kill circuitry 402 and 404 may be implemented, for example, in the final stage of the compression or accumulation of the lower partial products. Signals 'a' and 'b' represent bits from each multiplication operand (e.g., operands 302a,b from FIG. 3). Moreover, signal 'e' is used to enable or disable the sum and carry circuitry of the lower accumulator. For example, when 'e' is 1, the sum and carry circuitry of the lower accumulator is active and thus the respective sum ($S_L$) and carry ($C_L$) values of the lower accumulator are output. However, when 'e' is 0, the sum and carry circuitry of the lower accumulator is killed, and thus the sum ($S_L$) and carry ($C_L$) of the lower accumulator have values of 0. Accordingly, during square operations, 'e' is set to 0 to kill the sum and carry circuitry of the lower accumulator, which ensures that the lower partial products are skipped and the correct addition is performed.

As shown in FIGS. 4A-B, the sum and carry kill circuits can be fused with 2:2 compressor logic, and since the gates have a similar footprint as regular 3:2 compressor gates, integration into the multiplier data path is seamless.

Figure 5:
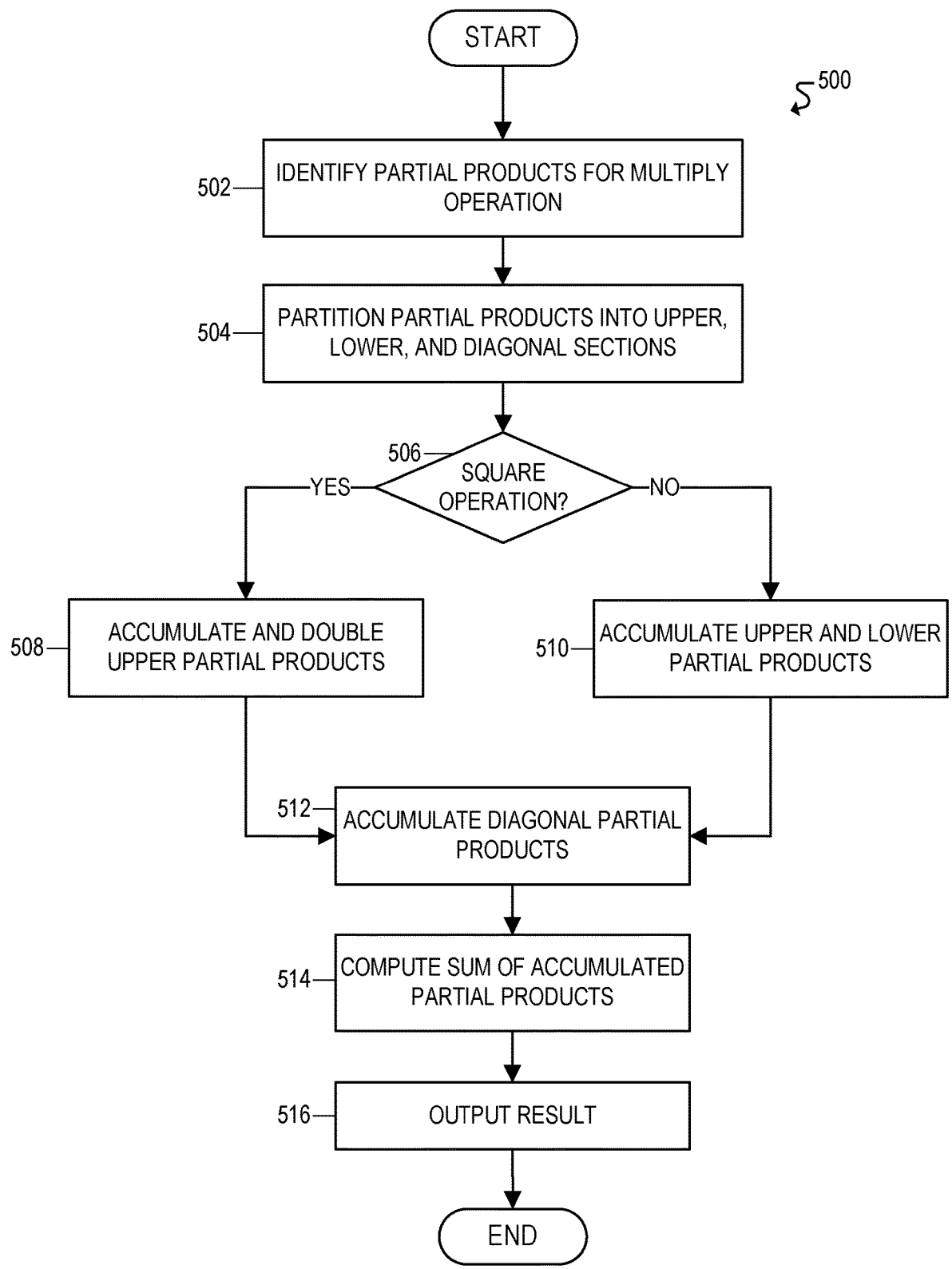
FIG. 5 illustrates a flowchart for an example embodiment of optimized multiplication and squaring.
Figure 6:
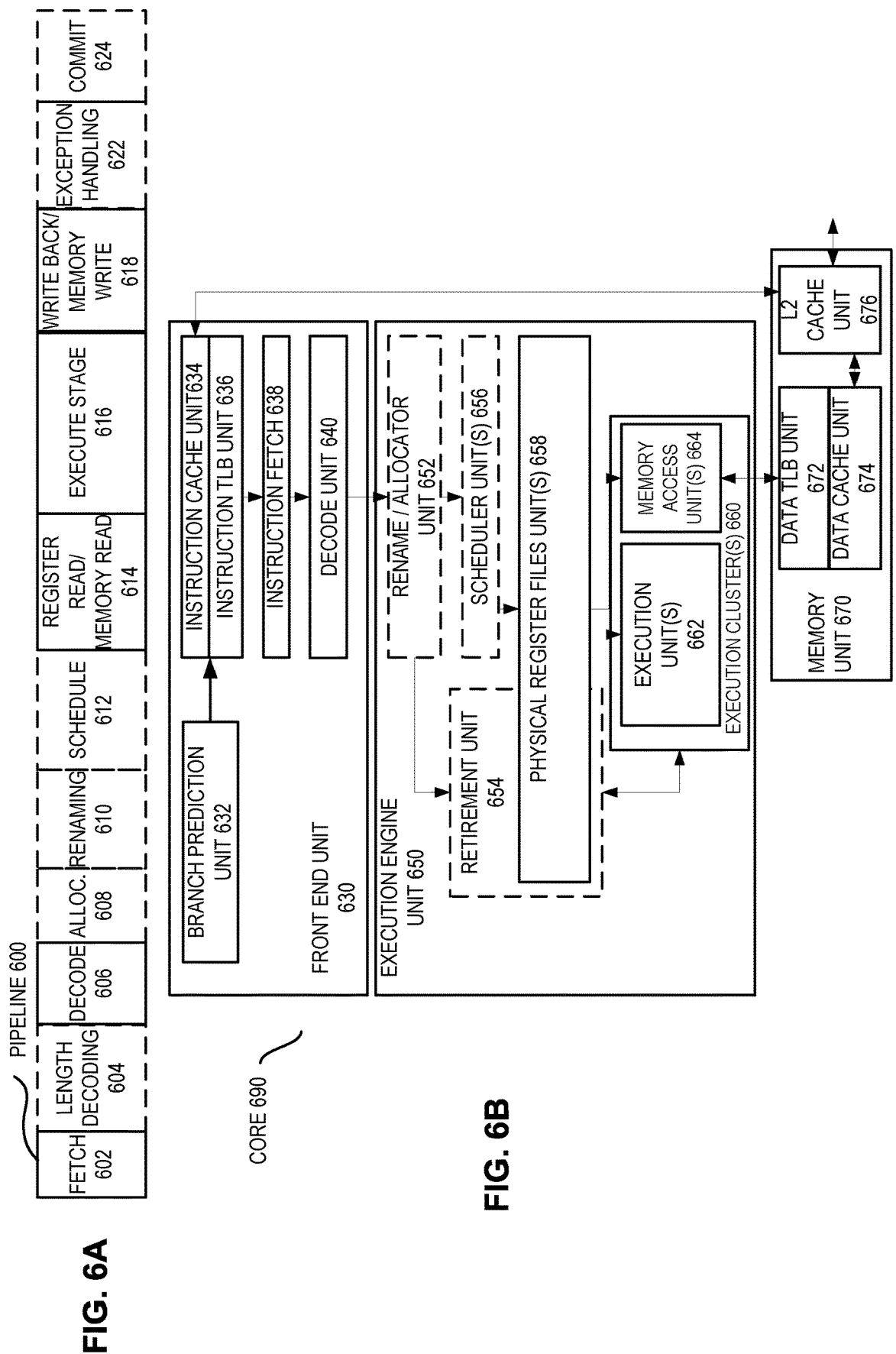
FIGS. 6A-B, 7, 8, 9, and 10 illustrate example computer architectures that can be used in accordance with embodiments disclosed herein.

FIG. 5 illustrates a flowchart 500 for an example embodiment of optimized multiplication and squaring. Flowchart 500 may be implemented, in some embodiments, using the embodiments and functionality described throughout this disclosure. In some embodiments, for example, flowchart 500 may be implemented by multiplier circuit 300 of FIG. 3.

The flowchart may begin at block 502 by identifying the partial products associated with a multiplication operation. The multiplication operation, for example, may involve multiplying two operands. In some embodiments, the multiplication operation may be associated with an RSA encryption operation.

The flowchart may then proceed to block 504 to partition the partial products into upper, lower, and diagonal sections. For example, the diagonal partial products may be based on the same place value (e.g., bit index) in each operand (e.g., $a_0 \cdot b_0$, $a_1 \cdot b_1$, and so forth), while the upper partial products and lower partial products may be based on different place values in each operand. Moreover, the place values of the upper partial products may be the reverse of those of the lower partial products (e.g., the place values of upper partial product $a_0 \cdot b_1$ are the reverse of lower partial product $a_1 \cdot b_0$). In this manner, general multiplication can be performed by accumulating the upper, lower, and diagonal partial products. For square operations, however, this partitioning results in upper and lower partial products that are redundant to each other, but diagonal partial products that are unique. Accordingly, square operations can be performed based on the upper partial products and the diagonal partial products, while disregarding the redundant lower partial products, as explained further below.

The flowchart may then proceed to block 506 to determine if the multiply operation is a square operation. A square operation, for example, may involve multiplying the same operand by itself. In some embodiments, a signal input or interface may be used to indicate whether the operation is a square operation.

If the multiply operation is a square operation, the flowchart may then proceed to block 508 to accumulate and double the upper partial products. For example, because a square operation involves multiplication of the same number by itself, the lower partial products are redundant to the upper partial products. Accordingly, in lieu of generating and accumulating the redundant lower partial products, the upper partial products may simply be doubled and accumulated. In some embodiments, for example, the upper partial products may be doubled by shifting each partial product to the next highest bit index.

For example, in some embodiments, a multiplier circuit may include separate partial product accumulators to accumulate the respective upper and lower partial products. Accordingly, when performing a square operation, the lower partial product accumulator may be selectively deactivated and/or powered down (e.g., using a power gate) to avoid generating and accumulating partial products that are redundant to those generated by the upper accumulator. Moreover, the upper partial product accumulator may be configured to shift the upper partial products to double their value.

If the multiply operation is NOT a square operation, the flowchart may then proceed to block 510 to accumulate the upper partial products and the lower partial products. In some embodiments, for example, separate accumulators may be used to accumulate the respective upper and lower partial products.

The flowchart may then proceed to block 512 to accumulate the diagonal partial products. For example, because the diagonal partial products are not redundant, they are accumulated for both general multiplication and square operations.

The flowchart may then proceed to block 514 to compute sum of accumulated partial product results. For example, for a general multiplication operation, the results from accumulating the upper, lower, and diagonal partial products are added together. For a square operation, however, the result from accumulating the doubled upper partial products is added with the result for the diagonal partial products, while the lower partial products are skipped.

The flowchart may then proceed to block 516 to output the final result of the multiplication operation. The final result of the multiplication operation may be the sum computed in block 514, and accordingly, that value may be output.

At this point, the flowchart may be complete. In some embodiments, however, the flowchart may restart and/or certain blocks may be repeated. For example, in some embodiments, the flowchart may restart at block 502 to continue performing accelerated multiply and square operations.

Example Computing Architectures

FIGS. 6-10 illustrate example computer architectures that can be used in accordance with embodiments disclosed herein. For example, in various embodiments, the computer architectures of FIGS. 6-10 may be used in conjunction with the optimized multiplier circuit described throughout this disclosure. Alternatively, in other embodiments, the computer architectures of FIGS. 6-10 may implement the functionality of the optimized multiplier circuit described throughout this disclosure.

Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 6A is a block diagram illustrating both an exemplary in-order pipeline and an exemplary register renaming, out-of-order issue/execution pipeline according to embodiments of the invention. FIG. 6B is a block diagram illustrating both an exemplary embodiment of an in-order architecture core and an exemplary register renaming, out-of-order issue/execution architecture core to be included in a processor according to embodiments of the invention. The solid lined boxes in FIGS. 6A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6A, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624.

FIG. 6B shows processor core 690 including a front end unit 630 coupled to an execution engine unit 650, and both are coupled to a memory unit 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM or other medium that stores microcode for certain macroinstructions (e.g., in decode unit 640 or otherwise within the front end unit 630). The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations, central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 658 comprises a vector registers unit, a write mask registers unit, and a scalar registers unit.

These register units may provide architectural vector registers, vector mask registers, and general purpose registers. The physical register file(s) unit(s) 658 is overlapped by the retirement unit 654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which includes a data TLB unit 672 coupled to a data cache unit 674 coupled to a level 2 (L2) cache unit 676. In one exemplary embodiment, the memory access units 664 may include a load unit, a store address unit, and a store data unit, each of which is coupled to the data TLB unit 672 in the memory unit 670. The instruction cache unit 634 is further coupled to a level 2 (L2) cache unit 676 in the memory unit 670. The L2 cache unit 676 is coupled to one or more other levels of cache and eventually to a main memory.

By way of example, the exemplary register renaming, out-of-order issue/execution core architecture may implement the pipeline 600 as follows: 1) the instruction fetch 638 performs the fetch and length decoding stages 602 and 604; 2) the decode unit 640 performs the decode stage 606; 3) the rename/allocator unit 652 performs the allocation stage 608 and renaming stage 610; 4) the scheduler unit(s) 656 performs the schedule stage 612; 5) the physical register file(s) unit(s) 658 and the memory unit 670 perform the register read/memory read stage 614; the execution cluster 660 perform the execute stage 616; 6) the memory unit 670 and the physical register file(s) unit(s) 658 perform the write back/memory write stage 618; 7) various units may be involved in the exception handling stage 622; and 8) the retirement unit 654 and the physical register file(s) unit(s) 658 perform the commit stage 624.

The core 690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 634/674 and a shared L2 cache unit 676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
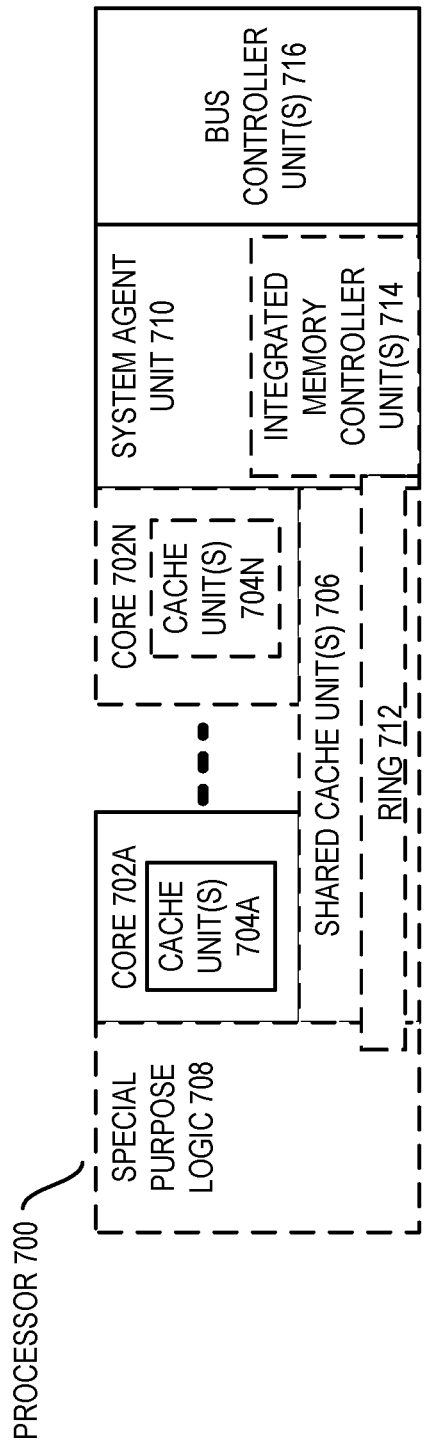

FIG. 7 is a block diagram of a processor 700 that may have more than one core, may have an integrated memory controller, and may have integrated graphics according to embodiments of the invention. The solid lined boxes in FIG. 7 illustrate a processor 700 with a single core 702A, a system agent 710, a set of one or more bus controller units 716, while the optional addition of the dashed lined boxes illustrates an alternative processor 700 with multiple cores 702A-N, a set of one or more integrated memory controller unit(s) 714 in the system agent unit 710, and special purpose logic 708.

Thus, different implementations of the processor 700 may include: 1) a CPU with the special purpose logic 708 being integrated graphics and/or scientific (throughput) logic (which may include one or more cores), and the cores 702A-N being one or more general purpose cores (e.g., general purpose in-order cores, general purpose out-of-order cores, a combination of the two); 2) a coprocessor with the cores 702A-N being a large number of special purpose cores intended primarily for graphics and/or scientific (throughput); and 3) a coprocessor with the cores 702A-N being a large number of general purpose in-order cores. Thus, the processor 700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 706, and external memory (not shown) coupled to the set of integrated memory controller units 714. The set of shared cache units 706 may include one or more mid-level caches, such as level 2 (L2), level 3 (L3), level 4 (L4), or other levels of cache, a last level cache (LLC), and/or combinations thereof. While in one embodiment a ring based interconnect unit 712 interconnects the integrated graphics logic 708, the set of shared cache units 706, and the system agent unit 710/integrated memory controller unit(s) 714, alternative embodiments may use any number of well-known techniques for interconnecting such units. In one embodiment, coherency is maintained between one or more cache units 706 and cores 702-A-N.

In some embodiments, one or more of the cores 702A-N are capable of multi-threading. The system agent 710 includes those components coordinating and operating cores 702A-N. The system agent unit 710 may include for example a power control unit (PCU) and a display unit. The PCU may be or include logic and components needed for regulating the power state of the cores 702A-N and the integrated graphics logic 708. The display unit is for driving one or more externally connected displays.

The cores 702A-N may be homogenous or heterogeneous in terms of architecture instruction set; that is, two or more of the cores 702A-N may be capable of execution the same instruction set, while others may be capable of executing only a subset of that instruction set or a different instruction set.

Figure 8:
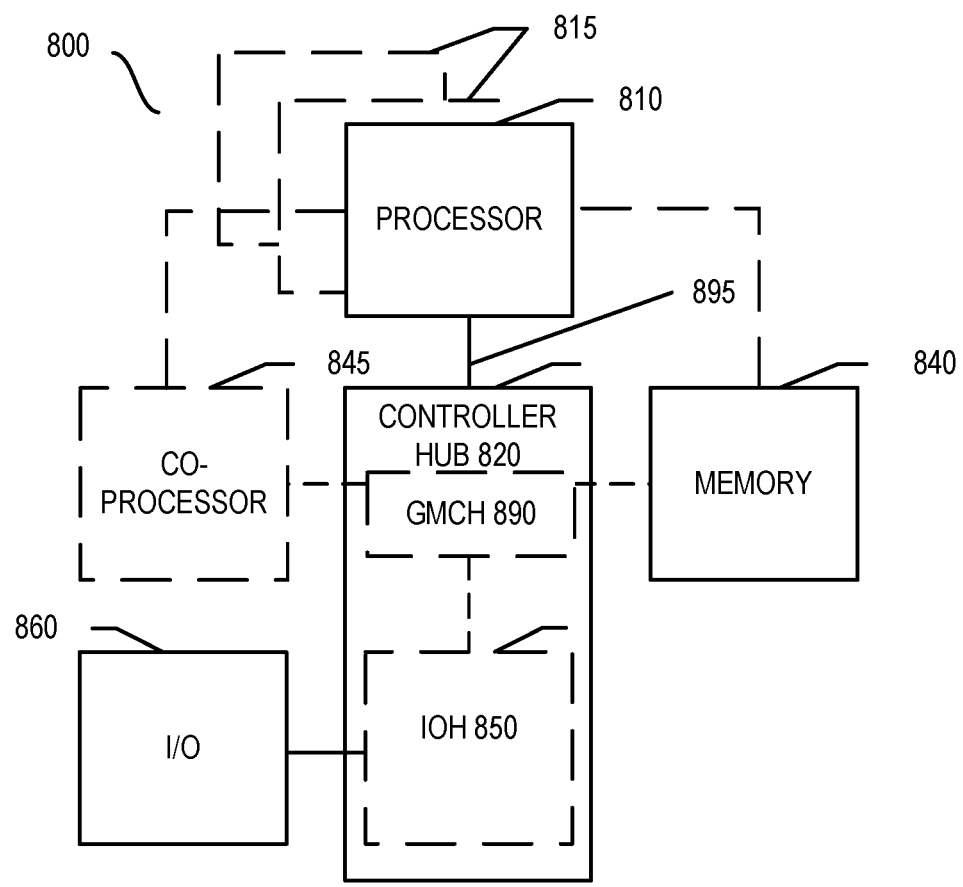

Referring now to FIG. 8, shown is a block diagram of a system 800 in accordance with one embodiment of the present invention. The system 800 may include one or more processors 810, 815, which are coupled to a controller hub 820. In one embodiment the controller hub 820 includes a graphics memory controller hub (GMCH) 890 and an Input/Output Hub (IOH) 850 (which may be on separate chips); the GMCH 890 includes memory and graphics controllers to which are coupled memory 840 and a coprocessor 845; the IOH 850 is couples input/output (I/O) devices 860 to the GMCH 890. Alternatively, one or both of the memory and graphics controllers are integrated within the processor (as described herein), the memory 840 and the coprocessor 845 are coupled directly to the processor 810, and the controller hub 820 in a single chip with the IOH 850.

The optional nature of additional processors 815 is denoted in FIG. 8 with broken lines. Each processor 810, 815 may include one or more of the processing cores described herein and may be some version of the processor 700.

The memory 840 may be, for example, dynamic random access memory (DRAM), phase change memory (PCM), or a combination of the two. For at least one embodiment, the controller hub 820 communicates with the processor(s) 810, 815 via a multi-drop bus, such as a frontside bus (FSB), point-to-point interface such as QuickPath Interconnect (QPI), or similar connection 895.

In one embodiment, the coprocessor 845 is a special-purpose processor, such as, for example, a high-throughput MIC processor, a network or communication processor, compression engine, graphics processor, GPGPU, embedded processor, or the like. In one embodiment, controller hub 820 may include an integrated graphics accelerator.

There can be a variety of differences between the physical resources 810, 815 in terms of a spectrum of metrics of merit including architectural, microarchitectural, thermal, power consumption characteristics, and the like.

In one embodiment, the processor 810 executes instructions that control data processing operations of a general type. Embedded within the instructions may be coprocessor instructions. The processor 810 recognizes these coprocessor instructions as being of a type that should be executed by the attached coprocessor 845. Accordingly, the processor 810 issues these coprocessor instructions (or control signals representing coprocessor instructions) on a coprocessor bus or other interconnect, to coprocessor 845. Coprocessor(s) 845 accept and execute the received coprocessor instructions.

Figure 9:
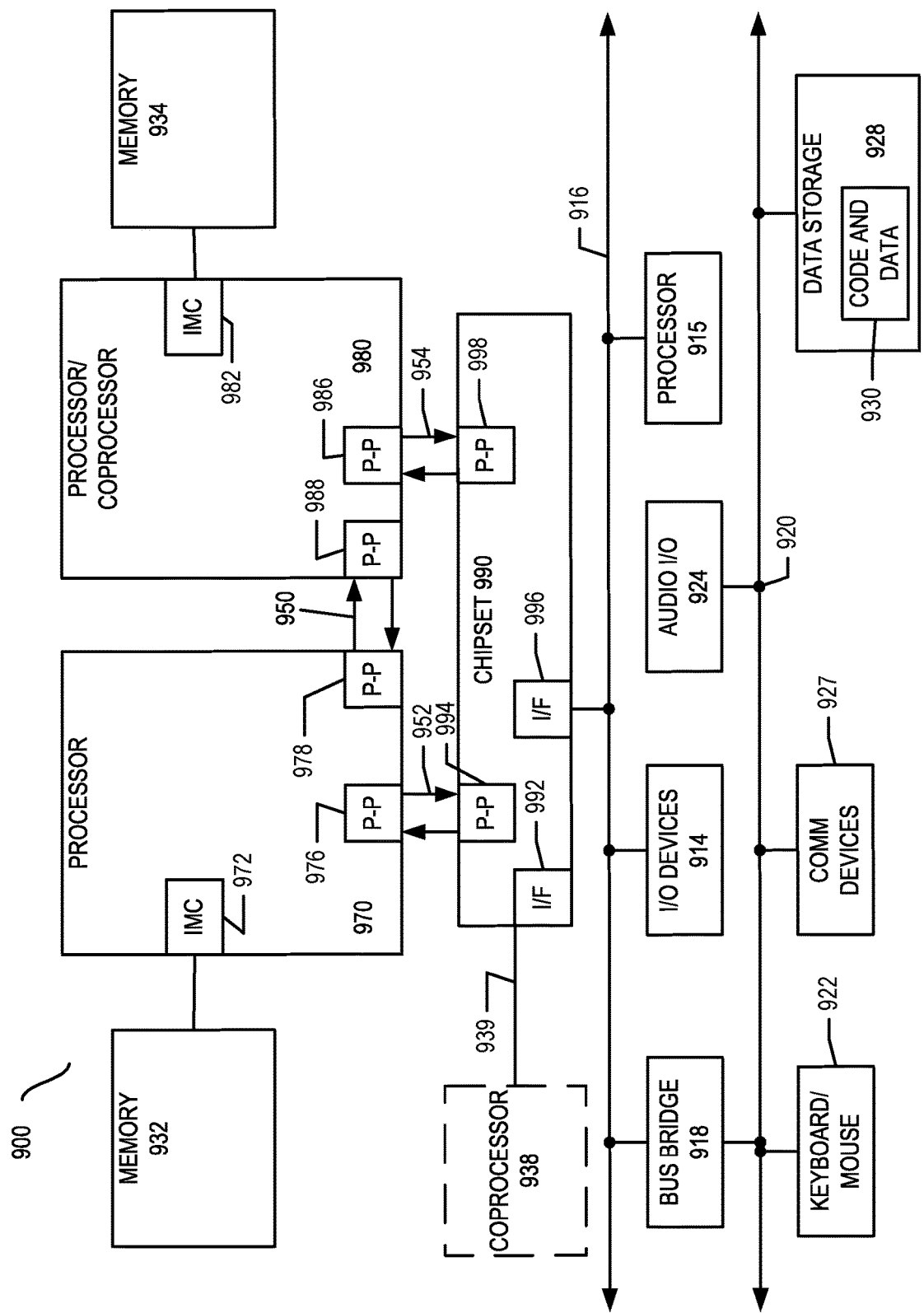

Referring now to FIG. 9, shown is a block diagram of a first more specific exemplary system 900 in accordance with an embodiment of the present invention. As shown in FIG. 9, multiprocessor system 900 is a point-to-point interconnect system, and includes a first processor 970 and a second processor 980 coupled via a point-to-point interconnect 950. Each of processors 970 and 980 may be some version of the processor 700. In one embodiment of the invention, processors 970 and 980 are respectively processors 810 and 815, while coprocessor 938 is coprocessor 845. In another embodiment, processors 970 and 980 are respectively processor 810 coprocessor 845.

Processors 970 and 980 are shown including integrated memory controller (IMC) units 972 and 982, respectively. Processor 970 also includes as part of its bus controller units point-to-point (P-P) interfaces 976 and 978; similarly, second processor 980 includes P-P interfaces 986 and 988. Processors 970, 980 may exchange information via a point-to-point (P-P) interface 950 using P-P interface circuits 978, 988. As shown in FIG. 9, IMCs 972 and 982 couple the processors to respective memories, namely a memory 932 and a memory 934, which may be portions of main memory locally attached to the respective processors.

Processors 970, 980 may each exchange information with a chipset 990 via individual P-P interfaces 952, 954 using point to point interface circuits 976, 994, 986, 998. Chipset 990 may optionally exchange information with the coprocessor 938 via a high-performance interface 939. In one embodiment, the coprocessor 938 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 990 may be coupled to a first bus 916 via an interface 996. In one embodiment, first bus 916 may be a Peripheral Component Interconnect (PCI) bus, or a bus such as a PCI Express bus or another third generation I/O interconnect bus, although the scope of the present invention is not so limited.

As shown in FIG. 9, various I/O devices 914 may be coupled to first bus 916, along with a bus bridge 918 which couples first bus 916 to a second bus 920. In one embodiment, one or more additional processor(s) 915, such as coprocessors, high-throughput MIC processors, GPGPU's, accelerators (such as, e.g., graphics accelerators or digital signal processing (DSP) units), field programmable gate arrays, or any other processor, are coupled to first bus 916. In one embodiment, second bus 920 may be a low pin count (LPC) bus. Various devices may be coupled to a second bus 920 including, for example, a keyboard and/or mouse 922, communication devices 927 and a storage unit 928 such as a disk drive or other mass storage device which may include instructions/code and data 930, in one embodiment. Further, an audio I/O 924 may be coupled to the second bus 920. Note that other architectures are possible. For example, instead of the point-to-point architecture of FIG. 9, a system may implement a multi-drop bus or other such architecture.

Figure 10:
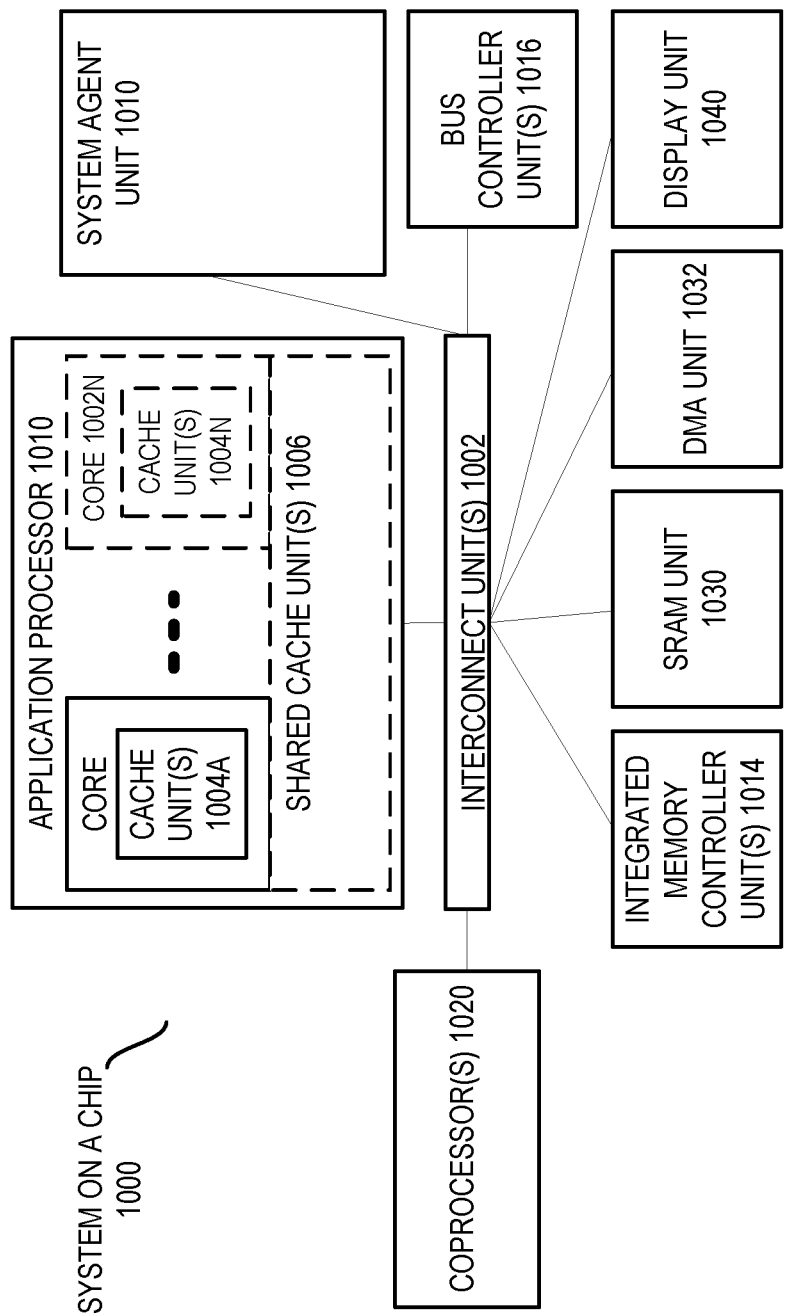

Referring now to FIG. 10, shown is a block diagram of a SoC 1000 in accordance with an embodiment of the present invention. Similar elements in FIG. 7 bear like reference numerals. Also, dashed lined boxes are optional features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 930 illustrated in FIG. 9, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a multiplier circuit to: identify a plurality of partial products associated with a multiply operation; partition the plurality of partial products into a first set of partial products, a second set of partial products, and a third set of partial products; determine whether the multiply operation is associated with a square operation; upon a determination that the multiply operation is associated with the square operation, compute a result based on the first set of partial products and the third set of partial products; and upon a determination that the multiply operation is not associated with the square operation, compute the result based on the first set of partial products, the second set of partial products, and the third set of partial products.

In one example embodiment of an apparatus: each partial product of the first set of partial products is based on different place values of a plurality of operands; each partial product of the second set of partial products is based on different place values of the plurality of operands; and each partial product of the third set of partial products is based on a same place value of the plurality of operands.

In one example embodiment of an apparatus, the multiplier circuit is further to: determine that the multiply operation is associated with the square operation; obtain a first partial product result based on a doubled value of the first set of partial products; and add the first partial product result and the third set of partial products.

In one example embodiment of an apparatus, the multiplier circuit is further to obtain the doubled value of the first set of partial products by shifting a bit index.

In one example embodiment of an apparatus, the multiplier circuit is further to: determine that the multiply operation is not associated with the square operation; obtain a first partial product result based on the first set of partial products; obtain a second partial product result based on the second set of partial products; and add the first partial product result, the second partial product result, and the third set of partial products.

In one example embodiment of an apparatus, the multiplier circuit comprises: a first partial product accumulator to obtain a first partial product result based on the first set of partial products; a second partial product accumulator to obtain a second partial product result based on the second set of partial products; and an adder to add at least the first partial product result and the third set of partial products.

In one example embodiment of an apparatus: the first partial product accumulator comprises a first compressor tree to obtain the first partial product result; and the second partial product accumulator comprises a second compressor tree to obtain the second partial product result.

In one example embodiment of an apparatus, the multiplier circuit further comprises a squaring mode signal input to indicate whether the multiply operation is associated with the square operation.

In one example embodiment of an apparatus, the multiplier circuit further comprises a power gate to disable the second partial product accumulator upon the determination that the multiply operation is associated with the square operation.

In one example embodiment of an apparatus, the multiply operation is associated with a cryptography operation.

One or more embodiments may include an at least one machine accessible storage medium having instructions stored thereon, wherein the instructions, when executed on a machine, cause the machine to: identify a plurality of partial products associated with a multiply operation to be performed by a multiplier circuit; partition the plurality of partial products into a first set of partial products, a second set of partial products, and a third set of partial products; determine, based on a squaring mode signal input of the multiplier circuit, whether the multiply operation is associated with a square operation; upon a determination that the multiply operation is associated with the square operation, compute a result based on the first set of partial products and the third set of partial products; and upon a determination that the multiply operation is not associated with the square operation, compute the result based on the first set of partial products, the second set of partial products, and the third set of partial products.

In one example embodiment of a storage medium: each partial product of the first set of partial products is based on different place values of a plurality of operands; each partial product of the second set of partial products is based on different place values of the plurality of operands; and each partial product of the third set of partial products is based on a same place value of the plurality of operands.

In one example embodiment of a storage medium, the instructions further cause the machine to: determine that the multiply operation is associated with the square operation; obtain a first partial product result based on a doubled value of the first set of partial products; and add the first partial product result and the third set of partial products.

In one example embodiment of a storage medium, the instructions further cause the machine to obtain the doubled value of the first set of partial products by shifting a bit index.

In one example embodiment of a storage medium, the instructions further cause the machine to: determine that the multiply operation is not associated with the square operation; obtain a first partial product result based on the first set of partial products; obtain a second partial product result based on the second set of partial products; and add the first partial product result, the second partial product result, and the third set of partial products.

In one example embodiment of a storage medium, the instructions further cause the machine to: obtain, from a first partial product accumulator, a first partial product result based on the first set of partial products; obtain, from a second partial product accumulator, a second partial product result based on the second set of partial products; and obtain, from an adder, a sum of at least the first partial product result and the third set of partial products.

In one example embodiment of a storage medium: the first partial product accumulator obtains the first partial product result using a first compressor tree; and the second partial product accumulator obtains the second partial product result using a second compressor tree.

In one example embodiment of a storage medium, the instructions further cause the machine to disable the second partial product accumulator upon the determination that the multiply operation is associated with the square operation.

In one example embodiment of a storage medium, the multiply operation is associated with a cryptography operation.

One or more embodiments may include a system, comprising: a memory to store information associated with an application; a processor to execute one or more instructions associated with the application; and a cryptography accelerator to perform a cryptography operation associated with the application, wherein the cryptography accelerator comprises a multiplier circuit to: identify a plurality of partial products associated with a multiply operation, wherein the multiply operation is associated with the cryptography operation; partition the plurality of partial products into a first set of partial products, a second set of partial products, and a third set of partial products; determine whether the multiply operation is associated with a square operation;

upon a determination that the multiply operation is associated with the square operation, compute a result based on the first set of partial products and the third set of partial products; and upon a determination that the multiply operation is not associated with the square operation, compute the result based on the first set of partial products, the second set of partial products, and the third set of partial products.

In one example embodiment of a system, the cryptography accelerator is further to: determine that the multiply operation is associated with the square operation; obtain a first partial product result based on a doubled value of the first set of partial products; and add the first partial product result and the third set of partial products.

In one example embodiment of a system, the cryptography accelerator is further to: determine that the multiply operation is not associated with the square operation; obtain a first partial product result based on the first set of partial products; obtain a second partial product result based on the second set of partial products; and add the first partial product result, the second partial product result, and the third set of partial products.

One or more embodiments may include a method, comprising: identifying a plurality of partial products associated with a multiply operation to be performed by a multiplier circuit; partitioning the plurality of partial products into a first set of partial products, a second set of partial products, and a third set of partial products; determining, based on a squaring mode signal input of the multiplier circuit, whether the multiply operation is associated with a square operation; computing a result of the multiply operation using the multiplier circuit, wherein: upon a determination that the multiply operation is associated with the square operation, the result is computed based on the first set of partial products and the third set of partial products; and upon a determination that the multiply operation is not associated with the square operation, the result is computed based on the first set of partial products, the second set of partial products, and the third set of partial products.

In one example embodiment of a method, the method further comprises: determining that the multiply operation is associated with the square operation; obtaining a first partial product result based on a doubled value of the first set of partial products; and adding the first partial product result and the third set of partial products.

In one example embodiment of a method, the method further comprises: determining that the multiply operation is not associated with the square operation; obtaining a first partial product result based on the first set of partial products; obtaining a second partial product result based on the second set of partial products; and adding the first partial product result, the second partial product result, and the third set of partial products.

What is claimed is:

1. A multiplier circuit, comprising:
circuitry to configure the multiplier circuit to perform a multiplication operation in normal mode or squaring mode, wherein the multiplication operation comprises accumulation of a plurality of partial product sets, wherein the plurality of partial product sets comprises:
  a set of upper partial products;
  a set of lower partial products; and
  a set of diagonal partial products;
a first accumulator circuit to accumulate the set of upper partial products into an upper partial product result;
a second accumulator circuit to selectively accumulate the set of lower partial products into a lower partial product result, wherein the second accumulator circuit is to be enabled when the multiplier circuit is configured in normal mode and disabled when the multiplier circuit is configured in squaring mode;
a shift circuit to selectively double the upper partial product result into a doubled upper partial product result, wherein the shift circuit is to be enabled when the multiplier circuit is configured in squaring mode and disabled when the multiplier circuit is configured in normal mode; and
an adder circuit to compute a result of the multiplication operation, wherein:
  when the multiplier circuit is configured in normal mode, the adder circuit is to compute the result based on addition of the upper partial product result, the lower partial product result, and the set of diagonal partial products; and
  when the multiplier circuit is configured in squaring mode, the adder circuit is to compute the result based on addition of the doubled upper partial product result and the set of diagonal partial products.

2. The multiplier circuit of claim 1:
wherein each partial product of the set of upper partial products is based on different place values of a plurality of operands;
wherein each partial product of the set of lower partial products is based on different place values of the plurality of operands; and
wherein each partial product of the set of diagonal partial products is based on a same place value of the plurality of operands.

3. The multiplier circuit of claim 1, wherein the circuitry to configure the multiplier circuit to perform the multiplication operation in normal mode or squaring mode comprises circuitry to:
access a plurality of operands associated with the multiplication operation, wherein the plurality of operands comprises a first operand and a second operand;
determine whether the first operand and the second operand are equivalent;
upon a determination that the first operand and the second operand are not equivalent, configure the multiplier circuit to perform the multiplication operation in normal mode; and
upon a determination that the first operand and the second operand are equivalent, configure the multiplier circuit to perform the multiplication operation in squaring mode.

4. The multiplier circuit of claim 1, wherein the shift circuit to selectively double the upper partial product result into the doubled upper partial product result comprises circuitry to left shift the upper partial product result by one bit index.

5. The multiplier circuit of claim 1, wherein:
the first accumulator circuit comprises a first compressor tree to accumulate the set of upper partial products into the upper partial product result; and
the second accumulator circuit comprises a second compressor tree to accumulate the set of lower partial products into the lower partial product result.

6. The multiplier circuit of claim 1, wherein the circuitry to configure the multiplier circuit to perform the multiplication operation in normal mode or squaring mode comprises:
a squaring mode signal input to indicate whether the multiplication operation is to be performed in normal mode or squaring mode.

7. The multiplier circuit of claim 1, further comprising a power gate to:
 enable the second accumulator circuit when the multiplier circuit is configured in normal mode; and
 disable the second accumulator circuit when the multiplier circuit is configured in squaring mode.

8. The multiplier circuit of claim 1, wherein the multiplication operation is associated with a cryptography operation.

9. At least one machine accessible storage medium having instructions stored thereon, wherein the instructions, when executed on a machine, cause the machine to:
 configure a multiplier circuit to perform a multiplication operation in normal mode or squaring mode, wherein the multiplier circuit comprises a first accumulator circuit, a second accumulator circuit, a shift circuit, and an adder circuit;
 identify a plurality of partial products sets associated with the multiplication operation, wherein the plurality of partial product sets comprises:
  a set of upper partial products;
  a set of lower partial products; and
  a set of diagonal partial products;
 accumulate, by the first accumulator circuit, the set of upper partial products into an upper partial product result;
 selectively accumulate, by the second accumulator circuit, the set of lower partial products into a lower partial product result, wherein the second accumulator circuit is to be enabled when the multiplier circuit is configured in normal mode and disabled when the multiplier circuit is configured in squaring mode;
 selectively double, by the shift circuit, the upper partial product result into a doubled upper partial product result, wherein the shift circuit is to be enabled when the multiplier circuit is configured in squaring mode and disabled when the multiplier circuit is configured in normal mode; and
 compute, by the adder circuit, a result of the multiplication operation, wherein:
  when the multiplier circuit is configured in normal mode, the adder circuit is to compute the result based on addition of the upper partial product result, the lower partial product result, and the set of diagonal partial products; and
  when the multiplier circuit is configured in squaring mode, the adder circuit is to compute the result based on addition of the doubled upper partial product result and the set of diagonal partial products.

10. The storage medium of claim 9:
 wherein each partial product of the set of upper partial products is based on different place values of a plurality of operands;
 wherein each partial product of the set of lower partial products is based on different place values of the plurality of operands; and
 wherein each partial product of the set of diagonal partial products is based on a same place value of the plurality of operands.

11. The storage medium of claim 9, wherein the instructions that cause the machine to configure the multiplier circuit to perform the multiplication operation in normal mode or squaring mode further cause the machine to:
 access a plurality of operands associated with the multiplication operation, wherein the plurality of operands comprises a first operand and a second operand;
 determine whether the first operand and the second operand are equivalent;
 upon a determination that the first operand and the second operand are not equivalent, configure the multiplier circuit to perform the multiplication operation in normal mode; and
 upon a determination that the first operand and the second operand are equivalent, configure the multiplier circuit to perform the multiplication operation in squaring mode.

12. The storage medium of claim 9, wherein the instructions that cause the machine to selectively double, by the shift circuit, the upper partial product result into a doubled upper partial product result further cause the machine to left shift the upper partial product result by one bit index.

13. The storage medium of claim 9, wherein:
 the first accumulator circuit comprises a first compressor tree to accumulate the set of upper partial products into the upper partial product result; and
 the second accumulator circuit comprises a second compressor tree to accumulate the set of lower partial products into the lower partial product result.

14. The storage medium of claim 9, wherein the multiplier circuit further comprises a power gate, and wherein the instructions further cause the machine to:
 enable the second accumulator circuit when the multiplier circuit is configured in normal mode; and
 disable the second accumulator circuit when the multiplier circuit is configured in squaring mode.

15. The storage medium of claim 9, wherein the multiplication operation is associated with a cryptography operation.

16. A system, comprising:
 a memory to store information associated with an application;
 a processor to execute one or more instructions associated with the application; and
 a cryptography accelerator to perform a cryptography operation associated with the application, wherein the cryptography accelerator comprises a multiplier circuit, wherein the multiplier circuit comprises:
  circuitry to configure the multiplier circuit to perform a multiplication operation in normal mode or squaring mode, wherein the multiplication operation is associated with the cryptography operation, and wherein the multiplication operation comprises accumulation of a plurality of partial product sets, wherein the plurality of partial product sets comprises:
   a set of upper partial products;
   a set of lower partial products; and
   a set of diagonal partial products;
  a first accumulator circuit to accumulate the set of upper partial products into an upper partial product result;
  a second accumulator circuit to selectively accumulate the set of lower partial products into a lower partial product result, wherein the second accumulator circuit is to be enabled when the multiplier circuit is configured in normal mode and disabled when the multiplier circuit is configured in squaring mode;
  a shift circuit to selectively double the upper partial product result into a doubled upper partial product result, wherein the shift circuit is to be enabled when the multiplier circuit is configured in squaring mode and disabled when the multiplier circuit is configured in normal mode; and
  an adder circuit to compute a result of the multiplication operation, wherein:

when the multiplier circuit is configured in normal mode, the adder circuit is to compute the result based on addition of the upper partial product result, the lower partial product result, and the set of diagonal partial products; and when the multiplier circuit is configured in squaring mode, the adder circuit is to compute the result based on addition of the doubled upper partial product result and the set of diagonal partial products.

17. The system of claim 16, wherein the circuitry to configure the multiplier circuit to perform the multiplication operation in normal mode or squaring mode comprises circuitry to:
access a plurality of operands associated with the multiplication operation, wherein the plurality of operands comprises a first operand and a second operand;
determine whether the first operand and the second operand are equivalent;
upon a determination that the first operand and the second operand are not equivalent, configure the multiplier circuit to perform the multiplication operation in normal mode; and
upon a determination that the first operand and the second operand are equivalent, configure the multiplier circuit to perform the multiplication operation in squaring mode.

18. The system of claim 16, wherein the multiplier circuit further comprises a power gate to:
enable the second accumulator circuit when the multiplier circuit is configured in normal mode; and
disable the second accumulator circuit when the multiplier circuit is configured in squaring mode.

19. A method, comprising:
configuring a multiplier circuit to perform a multiplication operation in normal mode or squaring mode, wherein the multiplier circuit comprises a first accumulator circuit, a second accumulator circuit, a shift circuit, and an adder circuit;
identifying a plurality of partial products sets associated with the multiplication operation, wherein the plurality of partial product sets comprises:
a set of upper partial products;
a set of lower partial products; and
a set of diagonal partial products;
accumulating, by the first accumulator circuit, the set of upper partial products into an upper partial product result;
selectively accumulating, by the second accumulator circuit, the set of lower partial products into a lower partial product result, wherein the second accumulator circuit is to be enabled when the multiplier circuit is configured in normal mode and disabled when the multiplier circuit is configured in squaring mode;
selectively doubling, by the shift circuit, the upper partial product result into a doubled upper partial product result, wherein the shift circuit is to be enabled when the multiplier circuit is configured in squaring mode and disabled when the multiplier circuit is configured in normal mode; and
computing, by the adder circuit, a result of the multiplication operation, wherein:
when the multiplier circuit is configured in normal mode, the adder circuit is to compute the result based on addition of the upper partial product result, the lower partial product result, and the set of diagonal partial products; and
when the multiplier circuit is configured in squaring mode, the adder circuit is to compute the result based on addition of the doubled upper partial product result and the set of diagonal partial products.

20. The method of claim 19, wherein configuring the multiplier circuit to perform the multiplication operation in normal mode or squaring mode comprises:
accessing a plurality of operands associated with the multiplication operation, wherein the plurality of operands comprises a first operand and a second operand;
determining whether the first operand and the second operand are equivalent;
upon a determination that the first operand and the second operand are not equivalent, configuring the multiplier circuit to perform the multiplication operation in normal mode; and
upon a determination that the first operand and the second operand are equivalent, configuring the multiplier circuit to perform the multiplication operation in squaring mode.

21. The method of claim 19, wherein the multiplier circuit further comprises a power gate, and wherein the method further comprises:
enabling, by the power gate, the second accumulator circuit when the multiplier circuit is configured in normal mode; and
disabling, by the power gate, the second accumulator circuit when the multiplier circuit is configured in squaring mode.

* * * * *